(12) United States Patent
Dellian et al.

(10) Patent No.: US 7,095,184 B2
(45) Date of Patent: *Aug. 22, 2006

(54) ELECTRONIC BALLAST FOR A LAMP TO BE OPERATED USING ITERATIVE VOLTAGE PULSES

(75) Inventors: Harald Dellian, Edling (DE); Reinhard Lecheler, Neuburg/Donau (DE); Oskar Schallmoser, Ottobrunn (DE)

(73) Assignee: Patent-Treuhand-Gesellschaft fur Elektrisch Gluhlampen mbH, Munich (DE)

( * ) Notice: Subject to any disclaimer, the term of this patent is extended or adjusted under 35 U.S.C. 154(b) by 41 days.

This patent is subject to a terminal disclaimer.

(21) Appl. No.: 10/909,393

(22) Filed: Aug. 3, 2004

(65) Prior Publication Data

US 2005/0035719 A1  Feb. 17, 2005

(30) Foreign Application Priority Data

Aug. 11, 2003 (DE) ............................... 103 36 857

(51) Int. Cl.
*H05B 37/02* (2006.01)
(52) U.S. Cl. .................. 315/224; 315/276; 315/DIG. 5
(58) Field of Classification Search ................ 315/276, 315/224
See application file for complete search history.

(56) References Cited

U.S. PATENT DOCUMENTS

2005/0035722 A1* 2/2005 Lecheler et al. ............ 315/276

* cited by examiner

*Primary Examiner*—David Vu
(74) *Attorney, Agent, or Firm*—Carlo S. Bessone

(57) ABSTRACT

A ballast and its operating method for a dielectrically impeded discharge lamp. The ballast contains a transformer having a third winding which can be short-circuited via a switch. By so doing, the injection of the voltage pulse into the lamp circuit may be controlled by an external trigger signal.

10 Claims, 4 Drawing Sheets

ELECTRONIC BALLAST FOR A LAMP TO BE OPERATED USING ITERATIVE VOLTAGE PULSES

TECHNICAL FIELD

The present invention relates to an electronic ballast for a lamp, in particular for a so-called "silent" discharge lamp which is designed for dielectrically impeded discharges.

BACKGROUND ART

Such discharge lamps are known per se. They must be operated using an electronic ballast which can apply iterative high-voltage pulses to the discharge lamp. However, the invention is also based on ballasts for other types of lamps which can be operated using iteratively produced voltage pulses, and particularly on those lamps or lamps with such circuitry that there is a capacitive characteristic as in the case of dielectrically impeded discharges.

It is also known per se to use inductances in ballasts for producing high-voltage pulses, and to produce the desired voltage pulses using various converter principles, for example so-called forward converters or flyback converters. The inductance may in this case be a simple inductor or else a so-called autotransformer having taps for a supply circuit and for a lamp circuit containing the lamp or, as is preferred here, may be an isolating transformer. The supply circuit produces a flow of current through the inductance and can be connected in this case using a switch, referred to here as a first switch (generally a primary circuit switch).

DISCLOSURE OF THE INVENTION

The invention is based on the technical problem of further developing this general principle for a ballast.

For this purpose, the invention provides a second winding, which is coupled to the first winding and can be short-circuited at a low resistance via a controllable second switch, of the inductance for the purpose of producing an operating phase for the ballast, in which the second winding is short-circuited at a low resistance.

In addition, the invention is based on a lighting system as claimed in claim 10, an electrical device as claimed in claim 11, and an operating method as claimed in claims 13 and 14.

Preferred embodiments of the invention, moreover, are described in the dependent claims.

The invention is thus distinguished by the possibility of short-circuiting a winding of the inductance. In reality, this short circuit naturally has a certain resistance other than zero, but needs to have a low resistance value in comparison with the remaining impedances, in order to be able to fulfill the function described in more detail below. The low-resistance short circuit of the winding limits an induction voltage across this winding to a very low value. As a result, the magnetic flux permeating the second winding is essentially constant over time, i.e. changes only very slowly over time in relation to the other time characteristics involved. By way of illustration, in the ballast according to the invention the flux permeating the second winding can thus be "frozen". The second winding, moreover, may also in this case be part of the first winding or vice versa, i.e. may differ from the first winding in terms of a tap or the taps. However, it may also be an actual second winding. In the case of an isolating transformer, the latter has two windings, namely the first and another (third) winding. In this case, the second winding may either be part of the first or the third winding or else may be a separate, isolated winding.

This provides a new degree of freedom for the developer and for the operation of the ballast, and this degree of freedom may be used in a great variety of ways according to the invention.

It is possible, in particular, to use the freezing of the magnetic flux through the second winding to largely suppress magnetic reactions in the core (in any case in relation to the magnetizing inductance of the second winding), if desired. During the short circuit, only the leakage inductances which are present in the case of real inductances thus remain critical. This aspect of the invention is described in more detail in the parallel application by the same applicant which was filed at the same time.

In the context of the present application, it is preferred, in contrast, to use the short circuit of the second winding and the operating phase defined by this short circuit, which will be referred to below for the sake of simplicity as the short-circuit phase, to control the timing of the ballast operation.

For this purpose, the short-circuit phase is preferably ended by a trigger signal which comes from the outside into the ballast. The ballast operation may thus be tuned to an external trigger signal by the trigger signal triggering (in this case preferably) the end (but also possibly the start) of the short-circuit phase. Naturally, the trigger signal and the end of the short-circuit phase in this case need not actually be simultaneous. Rather, unavoidable or intended delays may occur. This depends on the causality in the time control.

The trigger signal may in the narrower sense be a synchronous signal as long as a system which can oscillate independently can still be used in the ballast and the trigger signal can be used to synchronize this oscillation of the ballast. However, relevant in this context is preferably triggering in the narrower sense, i.e. complete time control of the internal time sequences in the ballast by means of the trigger signal. In other words: when there is no trigger signal, the operation of the ballast should in principle end, the ballast should thus derive its internal time sequences entirely from the trigger signal. There is thus preferably no independent operating clock signal. Of course, this is not impeded by control of internal sequences by electrical states and their measurement, since, according to the invention, these states are finally traced back to the trigger signal.

The converter principle, which is preferred in the context of the present application, for the inductance and the preferred transformer is the flyback converter principle. In the case of a flyback converter, the first winding has a supply current flowing through it which is interrupted by the first switch. The induction voltage pulse produced by the interruption is used in the lamp circuit as a starting or operating voltage pulse for the lamp.

In a particular refinement of the invention, the ballast is designed such that, when the first winding is isolated in this manner from the voltage source of the supply circuit, i.e. when the first switch opens, the second switch is closed, and the second winding is thus short-circuited. This may take place instantaneously at this point in time or even at a preceding point in time (in the case of unidirectional conductivity of the switch or in the case of rectifying circuitry). Then, the flow of current interrupted in the first winding as a result of the short circuit and the comparatively much higher impedance in the lamp circuit is almost completely taken over by the second winding (taking into account the voltage ratio), and is essentially retained there. If the second switch is then opened, this has the same effect, to a certain extent, as the conventional opening of the first switch according to the flyback converter principle, and produces the above described induction voltage pulse in the lamp circuit. The short-circuit phase thus delays the voltage pulse in the lamp circuit with respect to the opening of the first switch in the supply circuit.

Naturally, analogous "frozen states" could also be provided for other converter principles, for example in the case of a forward converter. The basic idea in this context is the fact that the short circuit of the second winding "freezes" the inductance or the transformer at a specific state, in any case as far as the flux permeating the second winding is concerned.

Since the operation of the lamp is iterative, when the second switch opens, in the context of the preferred flyback converter principle, the first switch closes. This closing of the first switch preferably takes place independently of the opening of the second switch in a time-controlled manner, i.e. once a time constant which is predetermined by a time control element, for example an RC element, has expired. This may take place, of course, in a state-controlled manner, for example as a function of the voltage applied to the first switch. In the case of a MOSFET, this would be as a function of the drain/source voltage. In this invention, however, IGBTs may also be used for the switches, in particular for the first switch. These have cost advantages and ever improving electrical properties as the technology is developed.

One preferred embodiment of the ballast circuit according to the invention, which is not shown in any more detail in the exemplary embodiment, is firstly distinguished by a pulse-shaping circuit for the incoming trigger signals. This pulse-shaping circuit matches the shape of the incoming trigger signal to the requirements of the downstream circuit components of the ballast and, in particular, propagates the pulse so as to produce a larger time interval between the pulse start and the pulse end. In the preferred embodiment, the pulse start of the shaped trigger signal results in the second switch opening, and the pulse end results in the second switch closing. In turn, it is of course in principle possible for defined time delays to exist between the pulse start or the pulse end and the corresponding switch response caused thereby. In particular with regard to the pulse start, however, it is preferred if these delays last no longer than is unavoidable, in order to allow for triggering which is as instantaneous as possible.

Furthermore, a preferred embodiment is distinguished by a bistable circuit which can be set by the trigger signal. This bistable circuit is set by the start of the trigger signal, preferably following a time delay, and results, by being set, in the closure of the first switch. On the other hand, it is reset by a current-measuring circuit measuring the current through the first winding when a particular current value is reached. The first switch then opens. The time delay thus determines, in the context of the previous paragraph, the time interval between the opening of the second switch, and thus the end of the short-circuit phase, and the beginning of a new charge phase. The end of the new charge phase is then controlled not by a time constant but by state control as a function of the winding current in the first winding. However, since charging begins as a function of the trigger signal, this also applies indirectly for the response of the current-measuring circuit as a result of the fixed inductance and supply voltage. There is thus no independent clocking of the ballast here either.

In general, the opening of the first switch in response to a specific current being reached by the first winding has some advantages. The energy fed to the inductance in the event of this flyback converter pulse is proportional to the square of this current through the first winding. If, at a particular current value, the first switch is opened, this "energy unit" is thus constant. If, in the case of conventional ballasts, a comparable switch had been clocked, without any further measures being taken, to a constant current value, unintended, but unavoidable increases or drops in the supply voltage would have become noticeable by this current value being reached correspondingly earlier or later and there thus being temporal fluctuations in the switching time. Finally, an increase in the supply voltage would thus be noticeable by an increase in the frequency, and a drop in the supply voltage would be noticeable by a reduction in the frequency, which runs counter to it being matched, in terms of time, to an external device, and would overall result in an increased power as a result of the increased frequency of the "energy units". On the other hand, with regular switching times, the "energy units" which have been increased or decreased in size would make a fluctuation in the power unavoidable.

With the invention, the switching time of the first switch may now be matched to the correct constant current value. The time fluctuations occurring in this case may be compensated for by matching the short-circuit phase such that, overall, inherent power stabilization may be achieved. Only over shorter time periods with a trigger signal which is fluctuating for other reasons would a short-term power fluctuation result from an irregularity in the trigger signal, as long as no correction is made by matching the current value at the switching time. These power fluctuations, however, are temporary and insignificant and should not be compared with power fluctuations caused by fluctuations in the supply voltage.

In addition to the ballast itself, the invention also relates to a lighting system which is made up of the ballast and a matching discharge lamp which is designed for dielectrically impeded discharges.

In addition, a particularly advantageous application of the invention is in an electrical device, preferably having an optical read device, in which such a lighting system is used. In this case, the lamp may be part of the illuminating device. If, in addition, the device now has an optical read device, for example is a scanner in a fax machine or else in other office equipment, the clock signal may, for example, ensure that the iterative pulsed operation of the lamp in the illuminating device, on the one hand, and the read clock of such a read device, on the other hand, are matched.

BRIEF DESCRIPTION OF THE DRAWINGS

A schematic example of a conventional ballast and a detailed exemplary embodiment of the invention will be described in more detail below. In this case, disclosed individual features may also be the subject of the invention in other combinations. In particular, the invention relates both to the ballast above and described below, the lighting system etc. as well as an operating method which is likewise explained above and implicitly below. The individual features are therefore also in each case to be understood in terms of their relevance as a feature of the method.

BEST MODE FOR CARRYING OUT THE INVENTION

Figure 1:
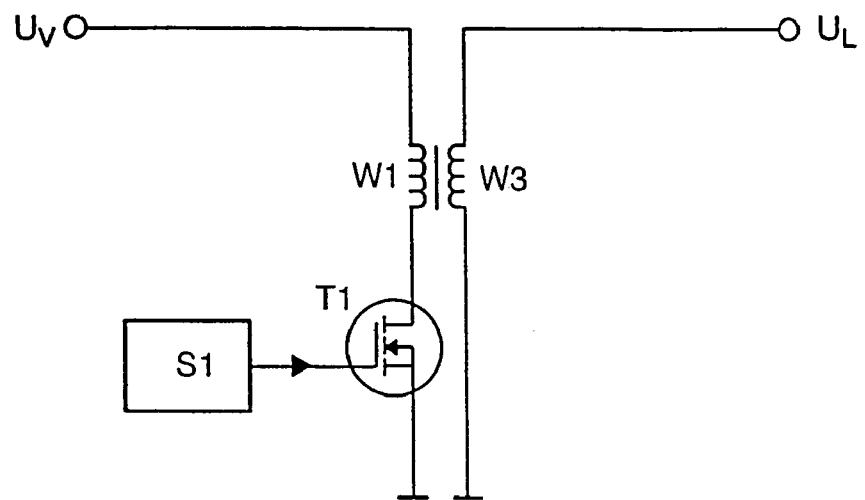
FIG. 1 shows a considerably simplified circuit diagram of a ballast for a dielectrically impeded discharge lamp according to the prior art.

FIG. 1 shows a very simplified circuit diagram of a conventional ballast having a supply voltage $U_V$ and an output voltage $U_L$ supplied to the lamp, which are both connected to ground (lower terminals in FIG. 1). The supply voltage $U_V$ has a first winding W1 of an isolating transformer, whose opposite terminal is connected to ground via a first switch T1. The first switch T1 is controlled by a control circuit S1 in a manner which is only of interest in principle here.

A further winding W3, which is referred to here for the purpose of consistency as the third winding, of the isolating transformer is coupled inductively to the first winding W1 and is coupled firstly to ground and secondly to the dielectrically impeded discharge lamp which is to be supplied with power. This is symbolized by the lamp voltage $U_L$. The lamp circuit thus contains the lamp, the third winding W3 and further components which are of no further interest here.

Figure 2:
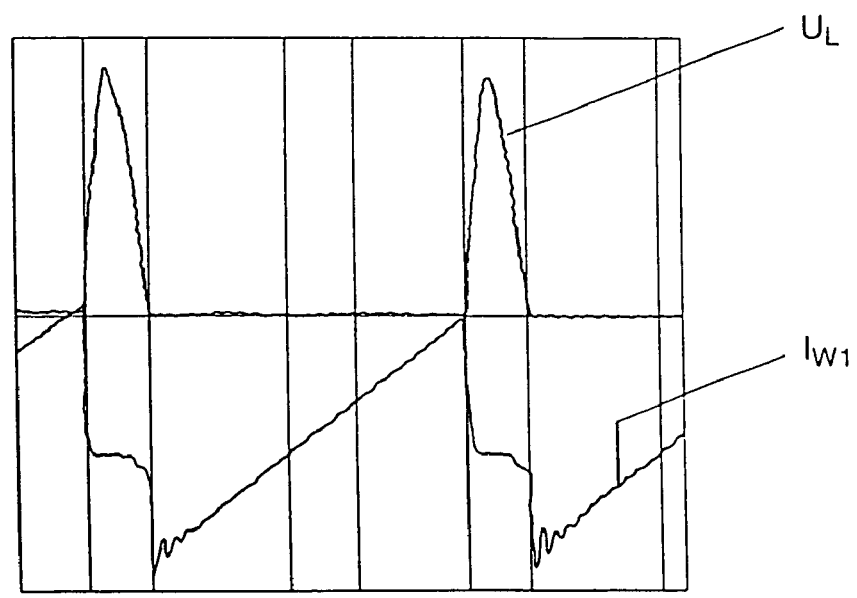
FIG. 2 shows current and voltage waveforms relating to FIG. 1.

If the circuit shown in FIG. 1 is operated as a flyback converter, the characteristics shown in FIG. 2 typically occur on the one hand for the voltage $U_L$ and on the other hand for the current $I_{W1}$ through the first winding. In this case, it is possible to distinguish schematically between three phases. In one phase, given the reference numeral 1 in FIG. 2, the winding current $I_{W1}$ rises linearly, and the first winding W1 is thus charged. At the end of phase 1, the first switch T1 is opened, with the result that $I_{W1}$ is suddenly reduced to zero, and, at the same time, a high induction voltage pulse $U_L$ is produced at the output of the third winding W3. This acts as a starting or operating pulse for the discharge lamp. The time phase of this voltage pulse $U_L$ is given the reference numeral 2. At the end of phase 2, the first switch T1 is generally closed. At the end of the voltage pulse, in a phase 3 which is to be referred to as the freewheeling phase, remaining residual energy is fed back from the lamp circuit via the transformer W1, W3, as is shown by the essentially linearly falling value for the winding current $I^{W1}$ (having the opposite mathematical sign to the charge phase 1). This third phase merges seamlessly with a new first phase. The closure of the first switch T1 is not absolutely necessary for the feedback step which can be seen in phase 3 in FIG. 2, i.e. for the induction current flow there through the first winding W1, in the case of a MOSFET having a body diode, since the body diode carries the current $I_{W1}$ at this polarity (feedback of energy to the supply voltage $U_V$).

Figure 3:
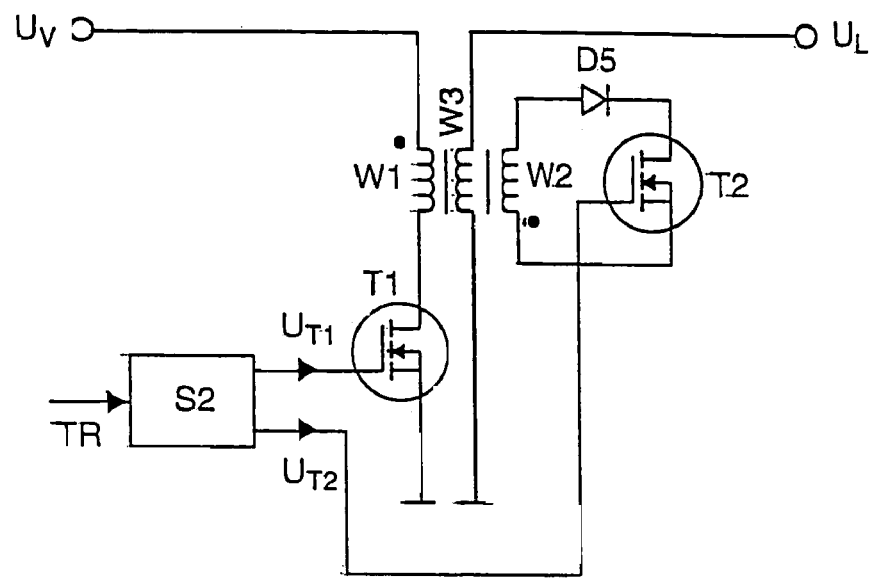
FIG. 3 shows a considerably simplified circuit diagram for a ballast according to the invention.

FIG. 3 shows an illustration which largely corresponds to that in FIG. 2 of the basic circuit diagram of a ballast according to the invention. The isolating transformer in this case has a second winding W2 which can be short-circuited via a second switch T2 and a diode D5. The switch T2 is driven by a controller S2 which takes the place of the controller S1 in FIG. 1 and which also in turn drives the first switch T1 which is connected in series with the first winding W1.

Figure 4:
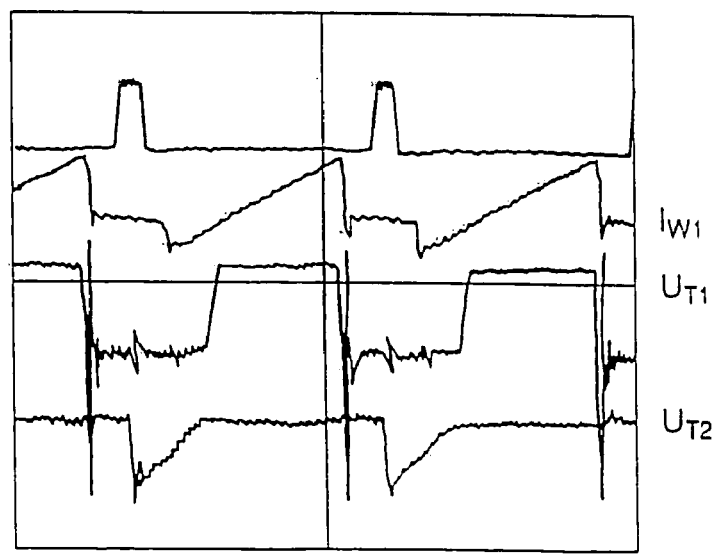
FIGS. 4–6 show current and voltage characteristics for the ballast from FIG. 3.
Figure 5:
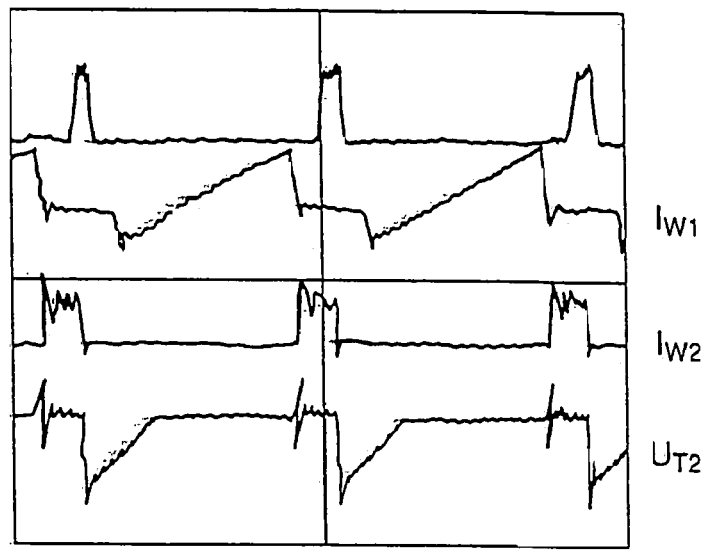
Figure 6:
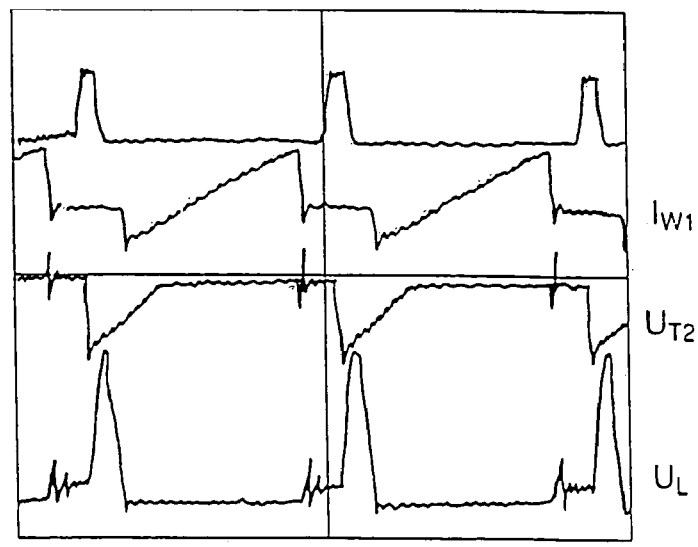

FIGS. 4–6 also show, in addition to the lamp voltage $U_L$ and the current $I_{W1}$ through the first winding, the current $I_{W2}$ through the second winding T2 and the drive voltages $U_{T1}$ and $U_{T2}$ for the first switch T1 and the second switch T2, respectively, i.e. the control signals of the controller S2.

It can be seen from FIG. 4 that the drive voltage $U_{T2}$ shows a time-delayed falling edge once the first switch T1 has been opened as described above, i.e. following the falling edge of $U_{T1}$. This corresponds to the opening of the second switch T2 and, as is shown in FIG. 6, results in the voltage pulse $U_L$ which in FIG. 2 directly follows the opening of the switch T1. This is different from the conventional exemplary embodiment shown in FIGS. 1 and 2 in that the behavior over time of the voltage $U_L$ at the output of the lamp circuit winding W3 is predetermined by the opening of the second switch T2 and not of the first switch T1. The remaining time characteristics are as have already been explained for FIG. 2, with the exception of the correspondingly longer quiescent phase of the current $I_{W1}$. In this case, the first switch T1 is again switched on at the latest on the zero crossing of the current $I_{W1}$. Feedback is possible, as has been mentioned, owing to the freewheeling diode of the switch T1. The first switch T1 being switched on then makes possible the new charge process, i.e. makes it possible for the current $I_{W1}$ to continue to rise linearly.

The rising edge of the signal $U_{T2}$ is at an angle with respect to the rising edge of the signal $U_{T1}$. This is of no significance in principle. In the present exemplary embodiment, the signal $U_{T2}$ is obtained from a capacitor discharge with subsequent inversion, which results in a sloping rising waveform. The switch-on time of the second switch T1 is not critical. It must merely occur prior to the switch-off time of the first switch T1. Relatively early switching-on of the second switch T2, as can be seen in FIG. 4, does not in this exemplary embodiment impair the steps in the circuitry up until the first switch T1 opens, since up to this point the corresponding induction voltages have polarities such that the diode D5 which can be seen in FIG. 3 is off and thus the short circuit actually only occurs owing to the polarity reversal of the induction voltage when the first switch T1 is opened.

Moreover, it can be seen that although, as is the case for conventional circuits of a comparable type, in the case of prescribed parameters, the duration of the charge phase (positive rise of $I_{W1}$), the duration of the voltage pulse $U_L$ and the feedback are essentially prescribed during the so-called third phase, the duration of the short-circuit phase which is connected to a certain extent as the fourth phase between the first phase and the second phase is freely selectable. This thus makes it possible for the opening of the second switch T2, i.e. the falling edge of the signal $U_{T2}$, to respond to an external trigger signal and thus to make possible clocking of the supply pulses $U_L$ which is determined completely externally and is also aperiodic, if necessary. Internal clocking of the circuit in FIG. 3 is not necessary. The trigger signal is illustrated symbolically by the line TR in FIG. 3 as the input to the drive circuit S2.

Figure 7:
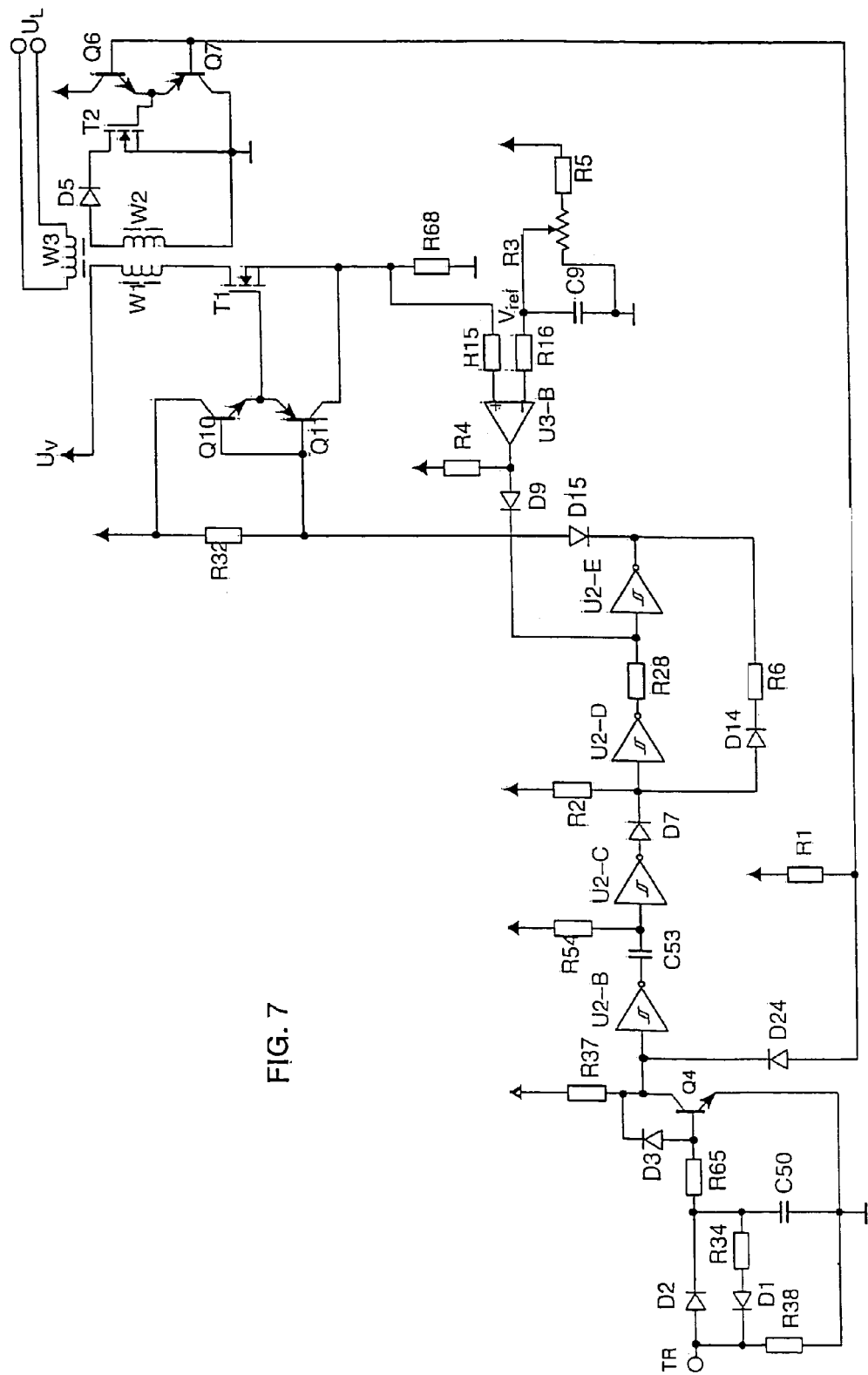
FIG. 7 shows a detailed switching device for the circuit diagram shown in FIG. 3.

FIG. 7 shows a detailed circuit diagram for the basic circuit illustrated in FIG. 3 of the ballast according to the invention. In FIG. 7, however, voltage control circuits for supply voltages, interference suppression circuits, auxiliary power supply circuits and similar details which are easily known to those skilled in the art and are subsidiary to the principle of the invention have been omitted.

Shown in the upper region is a voltage source $U_V$ which is applied as a supply voltage $U_V$ to the first winding W1 which can be seen in the right-hand upper region. The arrows illustrated above the resistors R32, R2, R5, R4, R1, R54 and R37 and the collector of the transistor Q6 symbolize supply potentials derived from the supply voltage $U_V$ which are all positive and which are not described in detail. The first winding W1 is connected to ground via the abovementioned first switch T1, a power MOSFET and a current-measuring resistor (in the actual embodiment a parallel circuit comprising shunt resistors owing to the current load). The first switch T1 is driven by means of a driver circuit known per se (so-called push-pull circuit) comprising two bipolar transistors Q10 and Q11, for which purpose its gate is connected to the emitters of these driver transistors. The bases of the driver transistors Q10 and Q11 are connected to one another and lead to the drive circuit (S2 in FIG. 3) which is illustrated in the left-hand lower region of FIG. 7 and is explained in more detail below. This connection may "pull back" the potential of the bases by means of the diode D15. If this does not take place, the potential of the bases is "pulled up" by means of the resistor R32 and the abovementioned voltage supply $U_V$.

In the upper, right-hand region of FIG. 7 can be seen the lamp circuit having the winding W3 and two terminals symbolizing the remaining lamp circuit, between which the voltage $U_L$ is applied.

Also shown in the upper, right-hand region of FIG. 7 is the "short circuit" having the second winding W2 and the second switch T2 and the diode D5. In turn, this is a power MOSFET, whose gate is driven via a bipolar driver circuit Q6 and Q7. The bases of the bipolar transistors Q6 and Q7 are driven by means of a line, which leads downwards in the right-hand region of FIG. 7 and to the left in the lower region, of the abovementioned drive circuit (S2 in FIG. 3). This takes place via the diode D24.

In the left-hand, lower region of FIG. 7, the drive circuit is shown in detail. The external trigger signal TR enters from the left and is propagated by a pulse-shaping circuit which reaches from there up to and including the components R37 and Q4, i.e. up to the terminal of the bases of the bipolar transistors Q6 and Q7 via D24. For this purpose, the rising edge is inverted, its voltage amplified and overall allowed to pass through instantaneously by means of the diode D2 and the resistor R65 and the voltage-amplification transistor Q4. D3 designates a Schottky diode for the purpose of desaturating the bipolar transistor Q4.

The falling edge of the trigger pulse, however, is subjected to a time delay by means of the timing circuit essentially comprising the resistor R34 and the capacitor C50, is inverted using this time delay, and is passed on with the voltage amplified. It is thus possible in the timing circuit for the capacitor C50 to be charged rapidly via the diode D2, but for it to be discharged only slowly via the diode D1 and the resistor R34.

The starting edge of the trigger signal TR which is now falling owing to the inversion may thus reduce, owing to the diode D24, the base potential of the driver transistors Q6 and Q7, and thus open the second switch T2. The switch T2 remains open until the potential has risen again on the other side of the diode D24 as a result of the time delay, such that the diode D24 is off and the bases are pulled up again via the resistor R1, as a result of which the second switch T2 is closed. This step corresponds to the sloping rise of the signal $U_{T2}$ in FIGS. 4–6.

U2-B, U2-C, U2-D and U2-E designate inverting Schmitt triggers. The capacitor C53 between the output of the Schmitt trigger U2-B and the input of the Schmitt trigger U2-C and the resistor R54 form a further timing element. The Schmitt trigger U2-B is used to again produce the original polarity of the trigger signal TR. With its falling edge, the capacitor C53 thus begins to be charged, its right-hand terminal being connected to the positive potential via the resistor R54.

This thus results in an AC voltage pulse input to the Schmitt trigger U2-C, which is allowed to pass through a diode in inverted fashion and thus appears as a positive voltage pulse at the output of the Schmitt trigger U2-C. A diode D7 allows this pulse to pass through to the input of the Schmitt trigger U2-D.

The next rising edge of the trigger signal TR appears to be rising at the output of the Schmitt trigger U2-B. Since the right-hand side of the capacitor C53 cannot be pushed out beyond the supply potential applied above the resistor R54 owing to clamping diodes (not shown in detail here) at the input of the Schmitt trigger U2-C, this positive pulse edge is not transported on by the Schmitt trigger U2-C.

The current through the first switch T1, i.e. the charge current $I_{W1}$, is measured via the resistor R68. The corresponding voltage value is applied to the positive input of a comparator U3-B via a resistor R15. A reference voltage value $V_{ref}$ formed by a variable resistor R3 and a resistor R5, is applied to the negative input (via a further resistor R16). In this case, the capacitor C9 is only provided for interference suppression purposes. The output of the comparator is thus positive when the current $I_{W1}$ exceeds a threshold value defined by $V_{ref}$. To be precise, this takes place via the resistor R4 and the supply potential, which is connected via said resistor R4, since the output of the comparator U3-B is at a high resistance value once the threshold value has been exceeded. At lower current values for $I_{W1}$, the output of the comparator U3-B conversely has a low resistance value so that the diode D9 is off.

The feedback loop formed by the diode D14 and the resistor R6 between the output of the Schmitt trigger U2-E and the input of the Schmitt trigger U2-D produces an interlock. The two Schmitt triggers U2-D and U2-E form, together with this feedback loop, a bistable circuit. As a result, the positive pulse formed by the threshold value for $I_{W1}$ being exceeded can set the abovementioned bistable circuit at the input of the Schmitt trigger U2-E and thus open the first switch T1 via the driver transistors Q10 and Q11.

It has been explained above that the falling edge of the trigger signal TR is subject to a time delay owing to the timing circuit comprising the resistor R34 and the capacitor C50 and is applied, by means of the diode D7, as a positive pulse to the input of the bistable circuit. This pulse may convert the bistable circuit such that the first switch T1 is closed.

The rising edge of the trigger signal TR overall firstly results essentially instantaneously in the second switch T2 being opened. As has already been mentioned, the second switch T2 is closed again via the diode D24 following the delay prescribed by the timing circuit. This time delay can be seen in FIG. 4.

The circuit illustrated forms the essential part of an electronic ballast for a preferably linear, dielectrically impeded discharge lamp in a device which contains a scanner having an optical CCD read device, for example an electronic photocopier or a fax machine.

The invention claimed is:

1. An electronic ballast for a lamp comprising:
   an inductance for producing iterative voltage pulses in a lamp circuit containing the lamp,
   the inductance has a first winding through which current is applied by a voltage source via a first controllable switch and which is isolated from the voltage source by the first switch,
   the inductance has a second winding coupled to the first winding and short-circuited by a controllable second switch, of the inductance for producing an operating phase for the ballast, in which the second winding is short-circuited at a low resistance, the operating phase is ended by a trigger signal input externally to the ballast, and a pulse-shaping circuit for shaping the trigger signals, the pulse start of the shaped trigger signal pulse resulting in the second switch opening, and the pulse end of the shaped trigger signal pulse resulting in the second switch closing.

2. The ballast as claimed in claim 1, wherein internal time sequences depend entirely on the trigger signal.

3. The ballast as claimed in claim 1, wherein the inductance is an isolating transformer.

4. The ballast as claimed in claim 1, wherein the ballast is a flyback converter for producing the voltage pulses.

5. The ballast as claimed in claim 4, wherein the first winding is isolated from the voltage source by opening the first switch, the second winding is short-circuited by the second switch, such that the induction, produced by the flow of current in the first winding, is taken over by a flow of current through the second winding, and the second switch is then opened, with the result that a voltage pulse is applied to the lamp circuit.

6. The ballast as claimed in claim 1 having a time control element for closing the first switch in a time-controlled manner once the second switch has been opened.

7. The ballast as claimed in claim 6, including a bistable circuit which is set, as a result of the trigger signal, by the time controller in order to close the first switch, and having a current-measuring circuit for measuring the current through the first winding, which resets the bistable circuit in order to open the first switch.

8. A lighting system comprising a discharge lamp designed for dielectrically impeded discharges and a ballast as claimed in claim 1 for supplying power to the discharge lamp.

9. An electrical device, in which a lighting system as claimed in claim 8 is incorporated, and a trigger signal line for a trigger signal matched to the operation of the electrical device is connected to the ballast such that the trigger signal can be applied for the purpose of ending the operating phase of the ballast.

10. The electrical device as claimed in claim 9, which has an optical read device which contains the discharge lamp, the trigger signal being matched to a read clock of the read device.

* * * * *